United States Patent
Kezuka et al.

(10) Patent No.: US 7,907,647 B2
(45) Date of Patent: Mar. 15, 2011

(54) OPTICAL ELEMENT, LIGHT EMITTING DEVICE AND METHOD FOR PRODUCING OPTICAL ELEMENT

(75) Inventors: Koichiro Kezuka, Kanagawa (JP); Hiroto Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 10/487,534

(22) PCT Filed: Jun. 18, 2003

(86) PCT No.: PCT/JP03/07744
§ 371 (c)(1),
(2), (4) Date: Feb. 24, 2004

(87) PCT Pub. No.: WO2004/004081
PCT Pub. Date: Jan. 8, 2004

(65) Prior Publication Data
US 2004/0233943 A1    Nov. 25, 2004

(30) Foreign Application Priority Data

Jun. 26, 2002  (JP) ................... P2002-186697

(51) Int. Cl.
*H01S 3/10* (2006.01)
*H01S 3/092* (2006.01)
*C30B 33/06* (2006.01)
(52) U.S. Cl. .............. 372/22; 372/71; 117/1
(58) Field of Classification Search ............ 372/22, 372/71; 117/1
See application file for complete search history.

(56) References Cited

U.S. PATENT DOCUMENTS
5,187,714 A    2/1993 Okazaki et al.
(Continued)

FOREIGN PATENT DOCUMENTS
EP    0 596 714 A1    5/1994
JP    4-283977 A    10/1991
(Continued)

OTHER PUBLICATIONS

MacKinnon, N. et al., A Laser Diode Array Pumped, nd:YVO4/KTP, composite material microchip laser. Optics Communications, Feb. 1, 1994 Vo. 105, No. 3/4, pp. 183 to 187.
(Continued)

*Primary Examiner* — Minsun Harvey
*Assistant Examiner* — Marcia A. Golub-Miller
(74) *Attorney, Agent, or Firm* — Robert J. Depke; Rockey, Depke & Lyons, LLC (57) ABSTRACT

The present invention relates to an optical element for converting light of prescribed wavelength emitted from a light source into light of wavelength different from the prescribed wavelength for outputting. A first crystal part (20) and a second crystal part (21) having respective surfaces opposed to each other whose coefficients of linear expansion are different by 5 ppm or more are optically polished so that the surfaces opposed to each other include crystallographic axes. An acrylic adhesive whose glass transition point is 75° C. or lower is applied to the adhesive surface of the first crystal part (20) or the second crystal part (21) to stick the first crystal part (20) and the second crystal part (21) to each other. The adhesive is irradiated with light to cure the adhesive and form an adhesive layer (22) having a refractive index of 1.52 or lower. Then, the first crystal part and the second crystal part stuck to each other are cut into a desired size to form the optical element. In the optical element, the separation of the adhesive layer (22) for connecting the first crystal element to the second crystal element and the damage of the crystal parts are suppressed.

15 Claims, 4 Drawing Sheets

U.S. PATENT DOCUMENTS

| | | | |
|---|---|---|---|
| 5,204,378 A * | 4/1993 | Maruno et al. | 522/39 |
| 5,287,381 A | 2/1994 | Hyuga et al. | |
| 5,289,479 A | 2/1994 | Oka et al. | |
| 5,377,212 A * | 12/1994 | Tatsuno et al. | 372/22 |
| 5,420,876 A | 5/1995 | Lussier et al. | |
| 5,539,765 A * | 7/1996 | Sibbett et al. | 372/92 |
| 5,703,900 A * | 12/1997 | Nozaki et al. | 372/107 |
| 5,940,419 A | 8/1999 | Xie | |
| 6,094,445 A | 7/2000 | Chen et al. | |
| 6,421,176 B1 * | 7/2002 | Takahashi et al. | 359/484 |
| 2001/0051022 A1 | 12/2001 | Kondo et al. | |
| 2003/0104200 A1 * | 6/2003 | Holguin et al. | 428/355 R |

FOREIGN PATENT DOCUMENTS

| | | |
|---|---|---|
| JP | 04-134891 A | 5/1992 |
| JP | 04134891 | 5/1992 |
| JP | 4-209581 | 7/1992 |
| JP | 5-129699 | 5/1993 |
| JP | 05129699 | 5/1993 |
| JP | 5-145160 A | 6/1993 |
| JP | 5-275785 | 10/1993 |
| JP | 6-204595 | 7/1994 |
| JP | 6-209135 | 7/1994 |
| JP | 08-29818 A | 2/1996 |
| JP | 11-005952 | 1/1999 |
| JP | 11005952 | 1/1999 |
| JP | 11-061081 A | 3/1999 |
| JP | 11061081 | 3/1999 |
| JP | 2000-124533 A | 4/2000 |
| JP | 2000124533 | 4/2000 |
| JP | 2000-183433 A | 6/2000 |
| JP | 2000183433 | 6/2000 |
| JP | 2001-196684 A | 7/2001 |
| JP | 2001-242363 A | 9/2001 |

OTHER PUBLICATIONS

Kuniaki Nakajima, "Hensei Acryl Jushi-kei Secchakuzai", Kogyo Zairyo Dec. 2000, Secchakuzai Data Book, edited by The Adhesion Society of japan, The Nikkan Kogyo Shinbun Ltd., Nov. 20, 1999, vol. 47, No. 13, pp. 82-86.

* cited by examiner

OPTICAL ELEMENT, LIGHT EMITTING DEVICE AND METHOD FOR PRODUCING OPTICAL ELEMENT

This application claims priority to Japanese Patent Application Number JP2002-186697, filed Jun. 26, 2002 which is incorporated herein by reference.

TECHNICAL FIELD

The present invention relates to an optical element for performing a wavelength conversion of light by using a non-linear optical phenomenon, a light emitting device for emitting light whose wavelength is converted by using the optical element and a method for producing the optical element.

This application claims a priority based on Japanese Patent Application No. 2002-186697 filed one Jun. 26, 2002 in Japan. The earlier application is applied to this application by referring to it.

BACKGROUND ART

As a compact short wavelength laser or a wavelength conversion laser, there is an OPO (Optical Parametric Oscillator) laser representative of an SHG (Second Harmonic Generation) laser using a non-linear optical crystal. This laser has a laser beam of a prescribed wavelength as a basic beam, converts the basic beam into a laser beam having a wavelength different from the wavelength of the basic beam and outputs the converted beam. The laser that performs the above-described wavelength conversion is used as various kinds of light sources of an optical disc device or an optical communication module or the like.

Such a laser employs a method that a solid-state laser crystal is provided in an internal cavity type OPO laser in which a non-linear optical crystal is disposed in a cavity and a laser beam outgoing from a semiconductor laser is allowed to be incident on the end face of the solid-state laser crystal side to pump the solid-state laser crystal and generate the basic light.

In this case, the above-described laser comes into contact with or sticks to all optical elements disposed in the cavity to form the cavity by the end face of the input side of the laser beam and the end face of the output side of the laser beam. Thus, a device can be made compact. Further, the optical elements may not need to be adjusted, the device can be applied to various kinds of uses. Further, not only the above-described laser can be made compact, but also conversion efficiency can be improved by repeatedly reflecting the basic beam in the cavity.

In a method for producing an optical element used in such a laser, relatively large wafer type two crystal parts are stuck to each other by an adhesive, and then, an optical film or the like is formed and the obtained product is cut into chips.

In this method, since the wafers can be stuck to each other under a state that the warp of the wafers due to the stress of the optical film is not produced, an adhesive layer having a uniform thickness can be obtained. Accordingly, not only various types of characteristics of optical parts can be improved, but also unevenness in characteristics of the cut chips can be suppressed.

In the above-described method for producing the optical element, the adhesive layer is exposed to high temperature upon formation of the optical film. Thus, the adhesive layer may be possibly peeled off or the damage of the crystal parts may be caused due to the difference in coefficient of linear expansion between the two crystal parts.

In the laser for generating the basic beam under the pumping by the laser beam from the semiconductor laser, the laser beam heats the optical elements. Accordingly, when the output of the laser beam is raised, the adhesive layer is peeled off or the two crystal parts are broken owing to the difference in coefficient of linear expansion between the two crystal parts.

Especially, when the two crystal parts greatly different in coefficient of linear expansion are stuck to each other, the peel-off of the adhesive layer or the damage of the crystal parts is outstandingly generated.

As a cause that the above-described adhesive layer is peeled off or the crystal parts are broken, a below-described phenomenon is considered. When the two crystal parts greatly different in coefficient of linear expansion are stuck to each other and exposed to high temperature under a condition that the two crystal parts are stuck to each other, a stress is generated in the adhesive layer due to the difference in coefficient of linear expansion. When the adhesive layer mitigates this stress, the adhesive layer will not be peeled off, nor a base will be broken. When the adhesive layer cannot mitigate the stress, the peel-off or the damage will be firstly generated from parts whose strength is lowest. Whether or not the adhesive layer is separated from the crystal parts or whether or not the crystal parts are broken is determined depending on the relation between the adhesive strength of the adhesive layer and the brittleness of the crystal parts. Here, whether or not the adhesive layer can mitigate the stress is determined depending on the mechanical materiality of the adhesive layer in which the adhesive is cured and a geometric factor including the thickness of the adhesive layer and an adhesive area.

DISCLOSURE OF THE INVENTION

It is an object of the present invention to provide a new optical element capable of solving the problems of the above-described optical element, a light emitting element using this optical element and a method for producing an optical element.

It is another object of the present invention to provide an optical element in which an adhesive layer is not peeled off or crystal parts are broken due to the difference in coefficient of linear expansion and a light emitting device having this optical element.

It is a still another object of the present invention to provide a method for producing an optical element in which the peel-off of an adhesive layer or the damage of crystal parts due to the difference in coefficient of linear expansion is not generated.

In order to achieve the above-described objects, an optical element according to the present invention serves to convert light having a prescribed wavelength emitted from a light source into light of wavelength different from the prescribed wavelength and output the light with the converted wavelength. The optical element comprises a first crystal part including $KTiOPO_4$ or quartz; a second crystal part including $YVO_4$ doping Nd, and an adhesive layer by which the first crystal part is stuck to the second crystal part. Surfaces of the first crystal part and the second crystal part opposed to each other through the adhesive layer have coefficients of linear expansion which are different by 5 ppm or more and the surfaces opposed to each other through the adhesive layer are disposed so as to include crystallographic axes. The adhesive layer is formed by curing an acrylic adhesive whose glass transition point is 75° C. or lower by applying light to the adhesive, wherein the refractive index of the adhesive layer after cure is 1.52 or lower.

In the optical element according to the present invention, the first crystal part and the second crystal part having respective surfaces opposed to each other whose coefficients of linear expansion are different by 5 ppm or more are disposed so that the surfaces opposed to each other include crystallographic axes. An acrylic adhesive whose glass transition point is 75° C. or lower is applied to the surface of the first crystal part or the second crystal part to allow the first crystal part to abut on the second crystal part. The adhesive is irradiated with light to cure the adhesive. Thus, the separation of an adhesive layer or the damage of the first crystal part and/or the second crystal part due to the difference in coefficient of linear expansion between the mutually opposed surfaces of the first crystal part and the second crystal part can be suppressed.

A light emitting device according to the present invention comprises: a light source for emitting light of prescribed wavelength; and an optical element including a first crystal part including $KTiOPO_4$ or quartz; a second crystal part including $YVO_4$ doping Nd; and an adhesive layer by which the first crystal part is stuck to the second crystal part; and converting light of wavelength emitted from a light source into light of wavelength different from the prescribed wavelength for outputting. Surfaces of the first crystal part and the second crystal part opposed to each other through the adhesive layer have coefficients of linear expansion which are different by 5 ppm or more. The surfaces opposed to each other through the adhesive layer are disposed so as to include crystallographic axes. The adhesive layer is formed by curing an acrylic adhesive whose glass transition point is 75° C. or lower by applying light to the adhesive, wherein the refractive index of the adhesive layer after cure is 1.52 or lower.

In the light emitting device according to the present invention, the first crystal part and the second crystal part having respective surfaces opposed to each other whose coefficients of linear expansion are different by 5 ppm or more are disposed so that the surfaces opposed to each other include crystallographic axes. An acrylic adhesive whose glass transition point is 75° C. or lower is applied to the surface of the first crystal part or the second crystal part to allow the first crystal part to abut on the second crystal part. The adhesive is irradiated with light to cure the adhesive. Thus, the separation of an adhesive layer or the damage of the first crystal part and/or the second crystal part due to the difference in coefficient of linear expansion between the mutually opposed surfaces of the first crystal part and the second crystal part can be suppressed.

In a method for producing an optical element according to the present invention, the method for producing the optical element for converting light of prescribed wavelength emitted from a light source into light of wavelength different from the prescribed wavelength for outputting comprises: a polishing step of optically polishing a first crystal part including $KTiOPO_4$ or quartz and a second crystal part including $YVO_4$ doping Nd so that surfaces opposed to each other have coefficients of linear expansion different by 5 ppm or more and the surfaces opposed to each other include crystallographic axes; an applying step of applying an acrylic adhesive whose glass transition point is 75° C. or lower to the surface of the first crystal part or the second crystal part; a sticking step of allowing the first crystal part to abut on the second crystal part through the adhesive applied in the applying step and irradiating the adhesive with light to cure the adhesive and form an adhesive layer having a refractive index of 1.52 or lower; and a cutting step of cutting the first crystal part and the second crystal part stuck to each other through the adhesive layer to a desired size.

In the method for producing an optical element according to the present invention, the first crystal part and the second crystal part having respective surfaces opposed to each other whose coefficients of linear expansion are different by 5 ppm or more are disposed so that the surfaces opposed to each other include crystallographic axes. An acrylic adhesive whose glass transition point is 75° C. or lower is applied to the surface of the first crystal part or the second crystal part to allow the first crystal part to abut on the second crystal part. The adhesive is irradiated with light to cure the adhesive and stick the first crystal part to the second crystal part. The first crystal part and the second crystal part stuck to each other is cut to an optical element of a desired size. In the optical element produced in such a manner, the separation of an adhesive layer or the damage of the first crystal part and/or the second crystal part due to the difference in coefficient of linear expansion between the first crystal part and the second crystal part can be suppressed.

Still other objects of the present invention and specific advantages obtained by the present invention will be more apparent from the explanation of embodiments described below by referring to the drawings.

BEST MODE FOR CARRYING OUT THE INVENTION

Now, an embodiment of the present invention applied to a laser pointer will be described below.

The laser pointer to which the present invention is applied can convert the wavelength of a laser beam emitted from a semiconductor laser and output a laser beam having shorter wavelength. A user can indicate a desired position by the laser beam.

Here, an ordinary laser pointer serves to apply the laser beam of a red wavelength band having about 600 nm or longer. The laser pointer to which the present invention is applied emits the laser beam of a green wavelength band of about 500 nm having a higher visibility than that of the red wavelength band.

Figure 1:
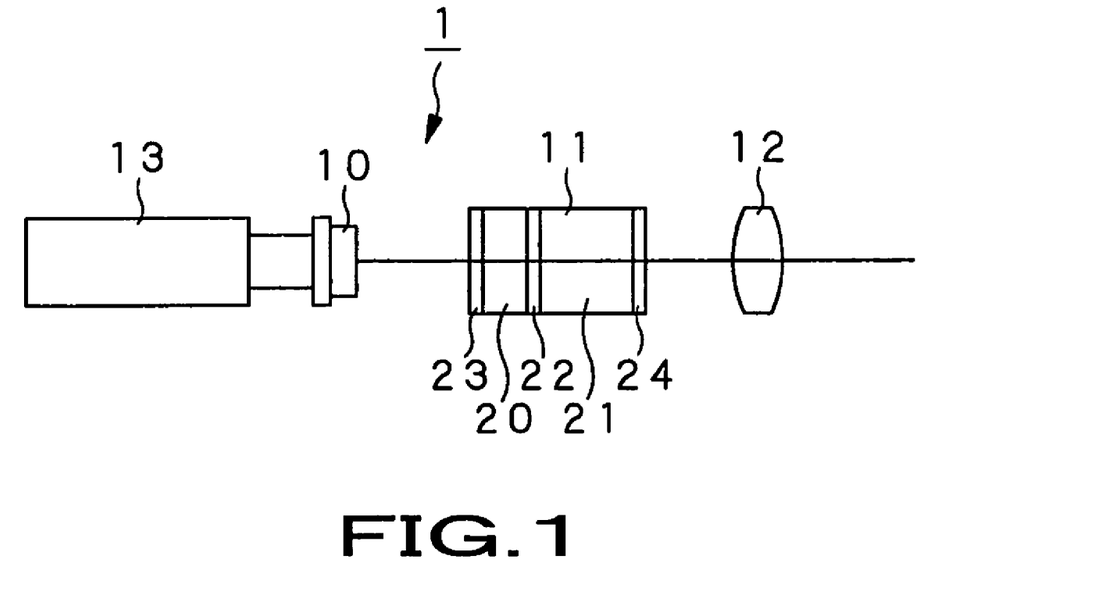
FIG. 1 is a side view showing the structure of a laser pointer to which the present invention is applied.

The laser pointer 1 to which the present invention is applied comprises, as shown in FIG. 1, a semiconductor laser 10 for emitting a laser beam, a wavelength converting element 11 for converting the laser beam emitted from the semiconductor laser 10 and outputting the converted laser beam, an emitting lens 12 for shaping the form of the beam of the laser beam converted by the wavelength converting element 11, and a battery 13 for supplying electric power to drive the semiconductor laser 10.

The semiconductor laser 10 is a semiconductor laser for emitting a laser beam having, for instance, the wavelength of about 808 nm.

The wavelength converting element 11 is an element for converting the wavelength of a laser beam emitted from the semiconductor laser 10 to output the laser beam of about 532 nm (refer it to as a converted beam, hereinafter.).

The emitting lens 12 is a lens element provided so as to shape the form of the beam of the converted beam. In the emitting lens 12, for instance, a position in the direction of an optic axis can be adjusted so as to adjust a beam radius.

The battery 13 is the battery for supplying electric power for driving the semiconductor laser 10. In order to make the structure of the laser pointer 1 compact, a compact battery is employed. When the casing of the laser pointer 1 described below is formed in a substantially cylindrical shape, the battery 13 is preferably configured in a cylindrical shape so that the battery is accommodated in the casing.

In the laser pointer 1 constructed as described above, the semiconductor laser 10, the wavelength converting element 11, the emitting lens 12 and the battery 13 are fixed in the casing not shown in the drawing. The laser pointer 1 is formed, for instance, in a substantially cylindrical shape, what is called, a pen type shape.

The wavelength converting element 11 includes a first crystal part 20, a second crystal part 21, an adhesive layer 22 formed by curing an adhesive between the first crystal part 20 and the second crystal part 21, and a first selective transmitting film 23 and a second selective transmitting film 24 as a pair of optical films between which the first crystal part 20 and the second crystal part 21 to form a cavity.

The first crystal part 20 is made of, for instance, $YVO_4$ (Yttrium Vanadate) doped with neodymium. The laser beam that passes through the first selective transmitting film 23 is allowed to be incident on the first crystal part 20 to output the laser beam having the wavelength of about 1064 nm (refer it to as a basic beam) pumped by the laser beam.

The second crystal part 21 is made of, for instance, $KTiOPO_4$ (refer it to as KTP, hereinafter.), converts the basic beam outputted from the first crystal part 20 to the laser beam having the wavelength ½ as long as the above-described wavelength, that is, the converted beam by the SHG and outputs the converted beam of about 532 nm to the second selective transmitting film 24.

The first crystal part 20 and the second crystal part 21 have surfaces opposed to each other whose coefficients of linear expansion are different by 5 ppm or more. The first and second crystal parts 20 and 21 are disposed so that the surfaces including their c-axes are opposed to each other to obtain optimum conditions for performing a phase matching by the SHG.

Here, in the case of the wavelength converting element 11 used for the SHG laser, $YVO_4$ is stuck to KTP. As for the relation of their crystallographic axes, since the c-axis of the KTP and the a/c combined axis of the $YVO_4$ are stuck to each other, the difference in coefficient of linear expansion between them becomes large like −0.65 (KTP)− 7.9 ($YVO_4$)=8.55 ppm.

The adhesive layer 22 is formed by irradiating an acrylic adhesive having light transmitting characteristics and a glass transition point Tg of about 75° C. or lower with ultraviolet rays or visible rays and by curing the adhesive, and has its refractive index of approximately 1.52 or lower. Especially, the adhesive layer 22 has a high transmittance relative to at least the wavelengths of the above-described laser beam and the basic beam.

The first selective transmitting film 23 is an optical film provided so as to transmit the laser beam and reflect the basic beam, and designed to have different transmittances and reflectances in accordance with the wavelengths of the laser beam and the basic beam. That is, the first selective transmitting film 23 allows the laser beam having the wavelength of about 808 nm to be transmitted and the laser beam having the wavelength of about 1064 nm to be reflected in accordance with the relation between the semiconductor laser 10, the first crystal part 20 and the second crystal part 21.

The second selective transmitting film 24 is an optical film provided so as to pass the converted beam and reflect the basic beam, and designed to have different transmittances and reflectances in accordance with the wavelengths of the basic beam and the converted beam. That is, the second selective transmitting film 24 allows the laser beam having the wavelength of about 532 nm to be transmitted and the laser beam having the wavelength of about 1064 nm to be reflected in accordance with the relation between the semiconductor laser 10, the first crystal part 20 and the second crystal part 21.

Now, an optical path in which the laser beam emitted from the semiconductor laser 10 is emitted as the converted beam in the laser pointer 1 having the wavelength converting element 11 constructed as described above will be described below.

The laser beam having the wavelength of about 808 nm emitted from the semiconductor laser 10 is made incident on the wavelength converting element 11 from the first selective transmitting film 23, passes through the first selective transmitting film 23 to be incident on the first crystal part 20 and pumps the first crystal part 20 to generate the basic beam having the wavelength of about 1064 nm.

Then, the basic beam having the wavelength of substantially 1064 nm outputted from the first crystal part 20 is incident on the adhesive layer 22 to pass through the adhesive layer 22. Then, the basic beam is incident on the second crystal part 21 to convert the wavelength in a prescribed conversion efficiency by the second crystal part 21 to obtain the converted beam having the wavelength of about 532 nm ½ times as long as the above-described wavelength.

Further, the rest of the basic beam having the wavelength of 1064 nm whose wavelength is not converted in the second crystal part 21 is incident on the second selective transmitting film 24 and reflected on the second selective transmitting film 24. Then, the rest of the basic beam is repeatedly reflected between the first selective transmitting film 23 and the second selective transmitting film 24 until the basic beam is converted to the converted beam having the wavelength of about 532 nm.

Subsequently, the converted beam having the wavelength of substantially 532 nm outputted from the second crystal part 21 is incident on the second selective transmitting film 24 and passes through the second selective transmitting film 24. Then, the converted beam is incident on the emitting lens 12 and emitted from the laser pointer 1 to a desired position so as to have a prescribed beam form.

As described above, in the laser pointer 1 according to the present invention, the laser beam having the wavelength of about 808 nm emitted from the semiconductor laser 10 is converted to the basic beam having the wavelength of about 1064 nm, then converted to the converted beam having the wavelength of about 532 nm, and the converted beam is outputted.

Now, the adhesive layer 22 will be described in more detail.

The adhesive layer 22 is formed, as described above, by irradiating the acrylic adhesive having the glass transition point Tg of about 75° C. or lower with the ultraviolet rays or the visible rays and by curing the adhesive, and has the refractive index of 1.52 or lower.

Here, the acrylic adhesive indicates an adhesive that adhesive molecules with molecular structures including functional groups composed of acrylic acid derivatives such as acrylate groups, methacrylate groups, urethane acrylate groups, etc. are bonded together and cured by a radical polymerization, an anionic polymerization, a cationic polymerization or the like at double bonds included in the acrylic acid derivatives.

As the adhesives used for the adhesive layer 22, Sample 1 to Sample 34 shown in the following Table 1 were used. Thus, the separation of the adhesive layer 22 and the damage of the first crystal part 20 and/or the second crystal part 21 which were generated when the laser beam with a prescribed output was emitted to the wavelength converting element 11 were judged. Then, the adhesives having good judgment results were used. The results of the Table 1 are shown as a graph in FIG. 2. ○ shown in the table and FIG. 2 designates that there is no separation of the adhesive layer 22, nor the damage of the first crystal part 20 and/or the second crystal part 21. x indicates that there is the separation of the adhesive layer 22 or the damage of the first crystal part 20 and/or the second crystal part 21.

TABLE 1

|  | Maker | Model | Kind | Tg (° C.) | Refractive Index | Judgment |
|---|---|---|---|---|---|---|
| Sample 1 | Adell | UT-20 | Acryl | 112 | 1.52 | x |
| Sample 2 | Adell | V300 | Acryl | — | 1.52 | x |
| Sample 3 | Adell | HV153 | Acryl | — | 1.63 | x |
| Sample 4 | Adell | HR154 | Acryl | — | — | x |
| Sample 5 | Chemitec | U471 | Acryl | 30 | 1.49 | ○ |
| Sample 6 | Daikin | UV3000 | Acryl | 100 | 1.498 | x |
| Sample 7 | Dena | XNR5472F | Acryl | 23 | — | x |
| Sample 8 | Dena | XNR5520 | Acryl | 34 | — | x |
| Sample 9 | Dena | T695/UR | Acryl | 75 | — | x |
| Sample 10 | Denka | OP1080L | Acryl | −8 | 1.544 | x |
| Sample 11 | Denka | OP1030K | Acryl | 8 | 1.555 | x |
| Sample 12 | Denka | OP1030M | Acryl | 7 | 1.548 | x |
| Sample 13 | Denka | OP1030MS | Acryl | 15 | 1.548 | x |
| Sample 14 | Denka | OP3010P | Acryl | — | — | x |
| Sample 15 | Loctite | 363 | Acryl | — | — | x |
| Sample 16 | Sunrise | PH150 | Acryl | −19 | 1.502 | ○ |
| Sample 17 | Sunrise | PH300 | Acryl | −20.8 | 1.505 | ○ |
| Sample 18 | Kyoritsu | 801seL6 | Acryl | 3 | — | ○ |
| Sample 19 | Kyoritsu | XVL90 | Acryl | 66 | 1.518 | ○ |
| Sample 20 | Kyoritsu | 8807L5 | Acryl | 62.7 | 1.518 | ○ |
| Sample 21 | Kyoritsu | X8750LK5 | Acryl | 37 | 1.616 | x |
| Sample 22 | Daikin | UV3100 | Epoxy | 130 | — | x |
| Sample 23 | Daikin | UV3200 | Epoxy | 162 | — | x |
| Sample 24 | Daikin | UV4000 | Epoxy | 52 | 1.567 | x |
| Sample 25 | Dena | XNR5507FL | Epoxy | 180 | — | x |
| Sample 26 | EMI | 3505 | Epoxy | 150 | 1.5152 | x |
| Sample 27 | EMI | 3507 | Epoxy | 142 | 1.56 | x |
| Sample 28 | EpoTek | OG146 | Epoxy | 75 | 1.4767 | x |
| Sample 29 | Norland | NOA61 | Epoxy | 30 | — | x |
| Sample 30 | Norland | NOA71 | Epoxy | 30 | 1.56 | x |
| Sample 31 | Norland | NOA73 | Epoxy | 30 | 1.56 | x |
| Sample 32 | Norland | NOA81 | Epoxy | 30 | 1.56 | x |
| Sample 33 | Norland | NOA88 | Epoxy | 30 | 1.56 | x |
| Sample 34 | Tree Bond | TB3121 | Epoxy | 41 | — | x |

The adhesives shown in the Sample 1 to the Sample 4 are acrylic adhesives which are respectively UT-20 (trade name), V300 (trade name), HV153 (trade name) and HR154 (trade name) produced by Adell Co., Ltd. The adhesive shown in the Sample 5 is an acrylic adhesive which is U471 (trade name) produced by Chemitec Co., Ltd. The adhesive shown in the Sample 6 is an acrylic adhesive which is UV3000 (trade name) produced by Daikin Industries, Ltd. The adhesives shown in the Sample 7 to the Sample 9 are acrylic adhesives which are respectively XNR5472F (trade name), XNR5520 (trade name) and T695/UR (trade name) produced by Nagase & Co., Ltd (DENA). The adhesives shown in the Sample 10 to the Sample 14 are acrylic adhesives which are respectively OP1080L (trade name), OP1030K (trade name), OP1030M (trade name), OP1030MS (trade name) and OP3010P (trade name) produced by Denki Kagaku Kogyo (DENKA) K. K. The adhesive shown in the Sample 15 is an acrylic adhesive which is 363 (trade name) produced by Henkel Japan Ltd. The adhesives shown in the Sample 16 and the Sample 17 are acrylic adhesives which are respectively PH150 (trade name) and PH300 (trade name) produced by Sunrise MSI Corporation. The adhesives shown in the Sample 18 to the Sample 21 are acrylic adhesives which are respectively 801seL6 (trade name), XVL90 (trade name), 8807L5 (trade name) and X8750LK5 (trade name) produced by Kyoritsu Chemical & Co., Ltd.

The adhesives shown in the Sample 22 to the Sample 24 are epoxy adhesives which are UV3100 (trade name), UV3200 (trade name) and UV4000 (trade name) respectively produced by Daikin Industries, Ltd. The adhesive shown in the Sample 25 is an epoxy adhesive which is XNR5507FL produced by Nagase & Co., Ltd. (DENA).

The adhesives shown in the sample 26 and the Sample 27 are epoxy adhesive which are 3505 (trade name) and 3507 (trade name) produced by SAN-EI TECH (EMI) Co., Ltd. The adhesive shown in the Sample 28 is an epoxy adhesive which is OG146 (trade name) produced by Daizo (EPOTEK) Corporation. The adhesives shown in the Sample 29 to the Sample 33 are epoxy adhesives which are NOA61 (trade name), NOA71 (trade name), NOA73 (trade name), NOA81 (trade name) and NOA 88 (trade name) respectively produced by SAN-EI TECH (NORLAND) Co., Ltd. The adhesive shown in the Sample 34 is an epoxy adhesive which is TB3121 (trade name) produced by Three bond Co., Ltd.

Figure 2:
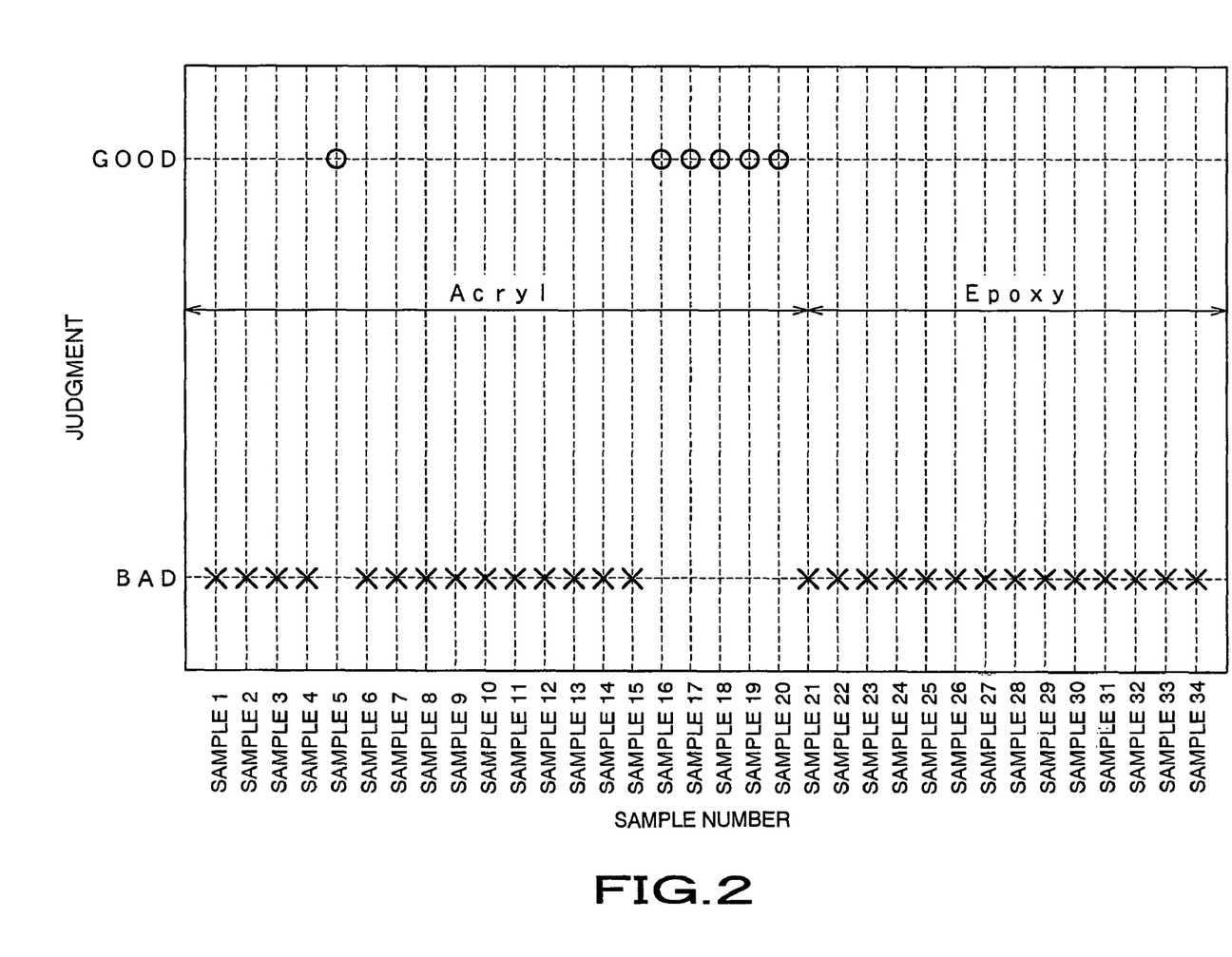
FIG. 2 is a diagram showing the decided results of samples of adhesives respectively forming adhesive layers of wavelength converting elements.

As apparent from the Table 1 and FIG. 2, the acrylic adhesives include the Samples in which the separation of the adhesive layer 22 or the damage of the first crystal element 20 and/or the second crystal part 21 are not generated. On the other hand, in the epoxy adhesives, the separation of the adhesive layer 22 or the damage of the first crystal part 20 and the second crystal part 21 are generated in all the Samples.

Figure 3:
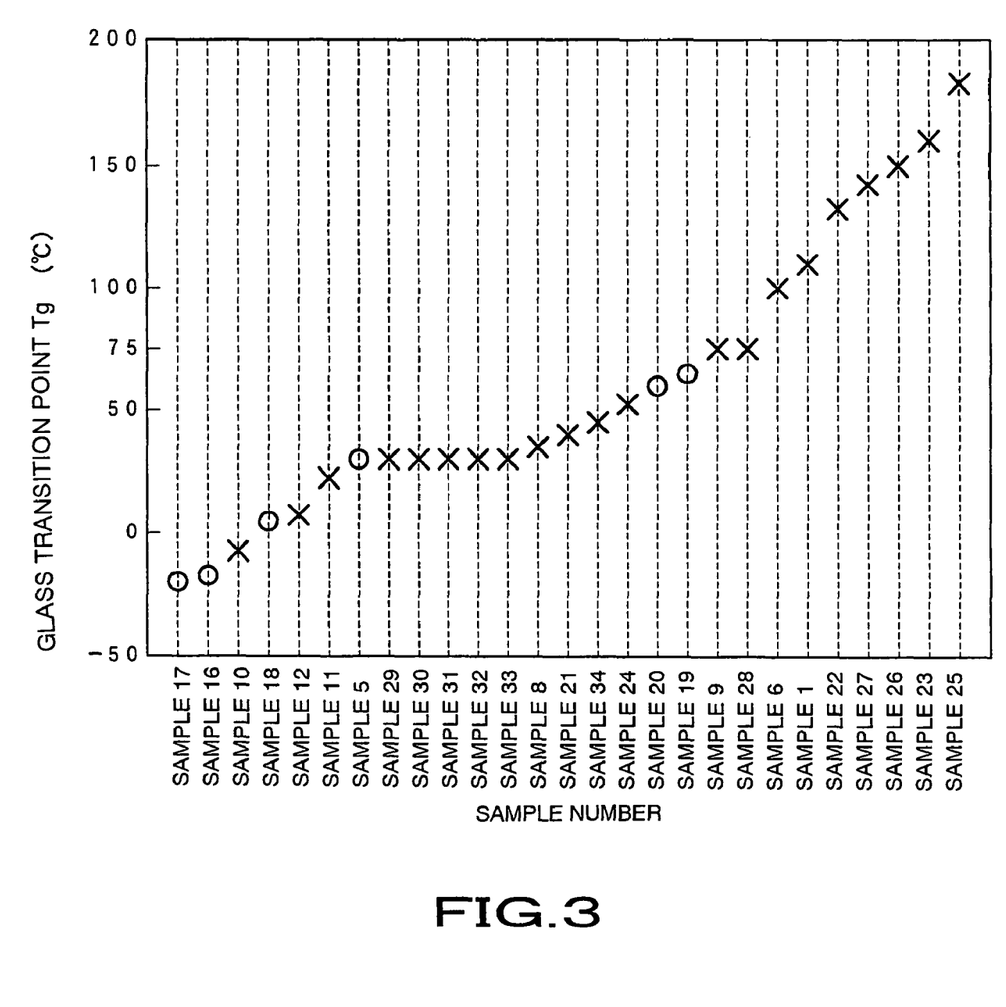
FIG. 3 is a diagram showing the decided results in which acrylic samples of the samples of the adhesives forming the adhesive layers of the wavelength converting elements are arranged in order of glass transition points Tg.

Now, in accordance with the Table 1, the acrylic adhesives having good judgment results are extracted. Thus, a graph showing the relation between the glass transition point Tg of each Sample and the separation of the adhesive layer 22 and the damage of the crystal parts is shown in FIG. 3. ○ indicates that the separation of the adhesive layer 22 or the damage of the first crystal part 20 and/or the second crystal part 21 does not exist. x indicates that the separation of the adhesive layer 22 or the damage of the first crystal part 20 and/or the second crystal part 21 is generated. Further, the sequence of the respective Samples in FIG. 3 shows that only the acrylic adhesives of the Samples shown in the Table 1 are rearranged in order of glass transition point Tg.

In FIG. 3, the glass transition point Tg of each Sample is paid attention to. In the adhesives having the glass transition point Tg of 75° C. or lower, there are Samples in which the peeling-off of the adhesive layer 22 or the damage of the first crystal part 20 and/or the second crystal part 21 is not generated. On the other hand, in the adhesives having the glass transition point Tg of 75° C. or higher, the peeling-off of the adhesive layer 22 or the damage of the first crystal part 20 and the second crystal part 21 is generated in all the Samples.

Figure 4:
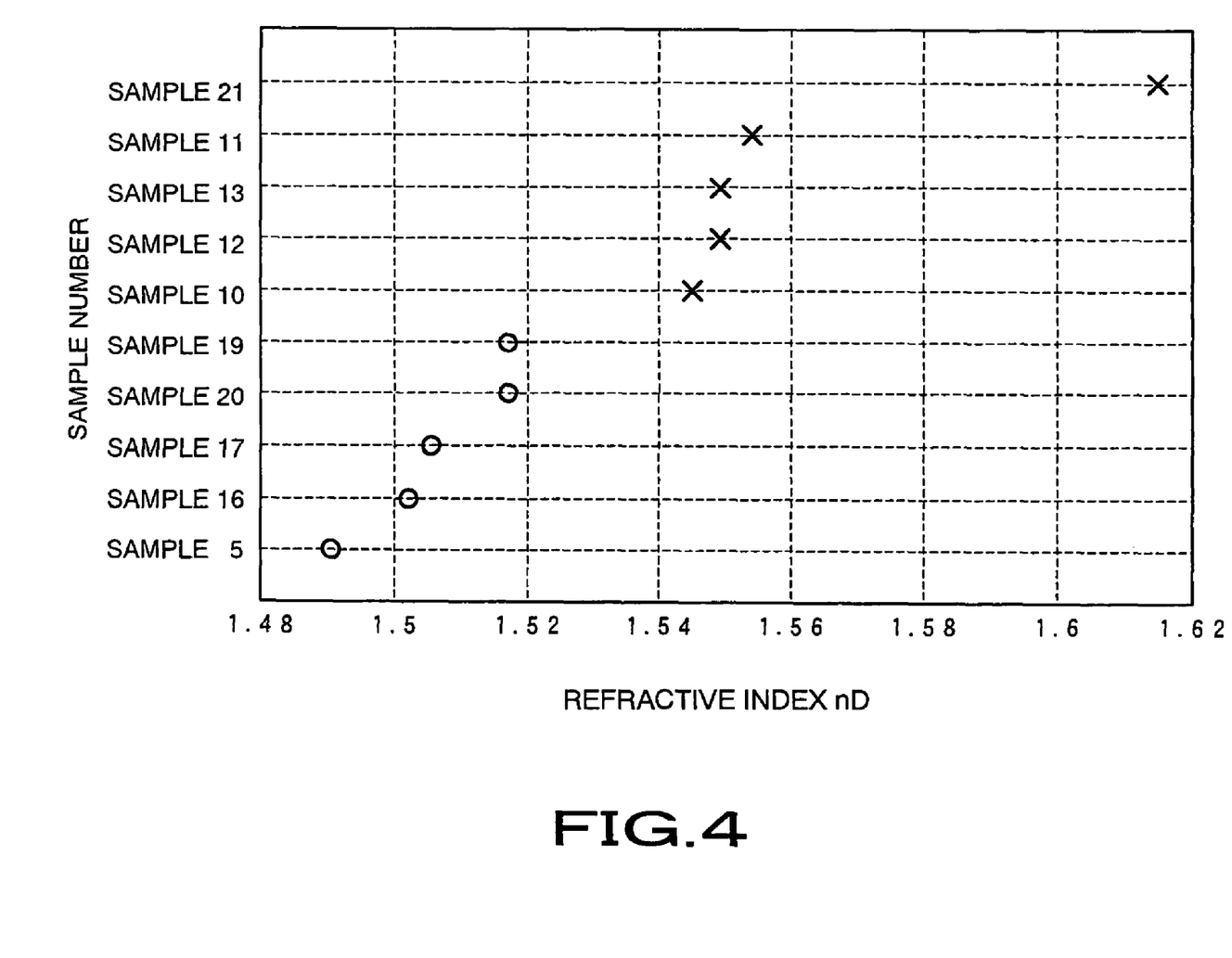
FIG. 4 is a diagram showing the acrylic samples of the samples of the adhesives forming the adhesive layers of the wavelength converting elements and the samples whose glass transition points are 75° C. or lower are arranged in order of refractive indexes nD after the adhesives are cured.

Now, in accordance with the results shown in FIG. 3, the acrylic adhesives having good judgment results and the grass transition point of 75° C. or lower are extracted. Thus, a graph showing the relation between the refractive index nD of each Sample and the separation of the adhesive layer 22 and the damage of the crystal parts is shown in FIG. 4. In FIG. 4, ○ indicates that the separation of the adhesive layer 22 or the damage of the first crystal part 20 and/or the second crystal part 21 does not exist. x indicates that the separation of the adhesive layer 22 or the damage of the first crystal part 20 and/or the second crystal part 21 is generated. Further, the sequence of the respective Samples in FIG. 4 shows that only the acrylic Samples having the grass transition point of 75° C. or lower shown in the Table 1 are rearranged in order of refractive index nD.

In FIG. 4, the refractive index nD of each Sample is paid attention to. In the adhesives having the refractive index nD of 1.52 or lower, the peeling-off of the adhesive layer 22 or the damage of the first crystal part 20 and/or the second crystal part 21 is not generated in all the Samples. On the other hand, in the adhesives having the refractive index nD higher than 1.52, the peeling-off of the adhesive layer 22 or the damage of the first crystal part 20 and/or the second crystal part 21 is generated in all the Samples.

As apparent from the results shown in the Table 1 and FIGS. 2 to 4, as the adhesive forming the adhesive layer 22, an acrylic adhesive having conditions of light transmitting characteristics and the glass transition point Tg of about 75° C. or lower, and the refractive index of about 1.52 or lower after the adhesive is irradiated with ultraviolet rays or visible rays to be cured is obviously preferable.

Specifically, as the adhesive forming the adhesive layer 22, the Samples 5, 16, 17, 19 and 20 shown in the Table 1 are preferable and they completely satisfy all the above-described conditions.

As described above, the adhesive layer 22 is formed by irradiating the acrylic adhesive having the light transmitting characteristics and the glass transition point Tg of about 75° C. or lower with the ultraviolet rays or the visible rays to be cured, and has the refractive index of 1.52 or lower after the adhesive is cured.

In the laser pointer 1 constructed as described above, the adhesive selected as described above is employed for the wavelength converting element 11. Accordingly, the generation of the separation of the adhesive layer 22 or the damage of the first crystal part 20 and/or the second crystal part 21 can be suppressed. Thus, the life of a product can be extended and the reliability of a product can be improved.

Further, in the laser pointer 1, the generation of the separation of the adhesive layer 22 or the damage of the first crystal part 20 and/or the second crystal part 21 can be suppressed. Accordingly, the laser beam of a higher output can be inputted and the output of the converted beam can be improved.

Further, in the laser pointer 1, the wavelength band of the converted beam, that is, the outputted laser beam can be converted to the green wavelength band high in its visibility. Accordingly, a bright and clear laser beam can be outputted even under a low output relative to a usual laser beam of a red wavelength band to improve the safety in use.

Still further, in the laser pointer 1, since the optical elements are bonded together to form the wavelength converting element 11 as described above, a simple device in which the number of parts can be reduced and an adjustment is not necessary can be obtained. Thus, a manufacture cost can be reduced.

In the above-described laser pointer 1, the structure of the device in which the converted beam has the wavelength of about 532 nm is explained. However, the features or the qualities of the semiconductor laser 10, the first crystal part 20 and the second crystal part 21, and the first selective transmitting film 23 and the second selective transmitting film 24 may be selected in accordance with the desired wavelength band of the converted beam. Further, the first crystal part 20 and the second crystal part 21 may be doped with dopant such as Nd having arbitrary concentration and may be set depending on use. Further, the first crystal part 20 and the second crystal part 21 may be formed in a flat shape, a curved shape or a spherical shape and may be laminated in layers. However, they are not limited to these shapes.

Now, a method for producing the wavelength converting element 11 used for the above-described laser pointer 1 will be described below.

Initially, a wafer of the first crystal part 20 and a wafer of the second crystal part 21 are optically polished so that their surfaces opposed to each other whose coefficients of linear expansion are different by 5 ppm or more include their crystallographic axes.

Then, the above-described adhesive is applied to the opposed surface of the wafer of the first crystal part 20 or the wafer of the second crystal part 21 to stick the wafer of the first crystal part 20 to the wafer of the second crystal part 21. The adhesive is irradiated with light to cure the adhesive and form the adhesive layer 22.

Subsequently, the first selective transmitting film 23 and the second selective transmitting film 24 are respectively formed on surfaces opposite to the adhesive layer 22 of the wafer of the first crystal part 20 and the wafer of the second crystal part 21. Then, the obtained part is cut to a desired size.

The wavelength converting element 11 is produced as described above. Specifically, the wavelength converting element 11 will be described in accordance with Example 1 to Example 24 and Comparative Example 1 to Comparative Example 13.

TABLE 2

|  | First Crystal part/Second Crystal part | Adhesive | Intensity of Light (mW/cm$^2$) |
|---|---|---|---|
| Example 1 | KTP/YVO$_4$ | Sample 20 | 1 |
| Example 2 | KTP/YVO$_4$ | Sample 17 | 1 |
| Example 3 | KTP/YVO$_4$ | Sample 20 | 5 |
| Example 4 | KTP/YVO$_4$ | Sample 17 | 5 |
| Example 5 | KTP/YVO$_4$ | Sample 20 | 1 |
| Example 6 | KTP/YVO$_4$ | Sample 17 | 1 |
| Example 7 | KTP/YVO$_4$ | Sample 20 | 5 |
| Example 8 | KTP/YVO$_4$ | Sample 17 | 5 |
| Example 9 | Quartz/Glass | Sample 20 | 1 |
| Example 10 | Quartz/Glass | Sample 17 | 1 |
| Example 11 | Quartz/Glass | Sample 20 | 5 |
| Example 12 | Quartz/Glass | Sample 17 | 5 |
| Example 13 | Quartz/Glass | Sample 20 | 1 |
| Example 14 | Quartz/Glass | Sample 17 | 1 |
| Example 15 | Quartz/Glass | Sample 20 | 5 |
| Example 16 | Quartz/Glass | Sample 17 | 5 |
| Example 17 | YVO$_4$/Quartz | Sample 20 | 1 |
| Example 18 | YVO$_4$/Quartz | Sample 17 | 1 |
| Example 19 | YVO$_4$/Quartz | Sample 20 | 5 |
| Example 20 | YVO$_4$/Quartz | Sample 17 | 5 |
| Example 21 | YVO$_4$/Quartz | Sample 20 | 1 |
| Example 22 | YVO$_4$/Quartz | Sample 17 | 1 |
| Example 23 | YVO$_4$/Quartz | Sample 20 | 5 |
| Example 24 | YVO$_4$/Quartz | Sample 17 | 5 |
| Comparative example 1 | KTP/YVO$_4$ | Sample 1 | 1 |
| Comparative Example 2 | KTP/YVO$_4$ | Sample 10 | 1 |
| Comparative Example 3 | KTP/YVO$_4$ | Sample 28 | 1 |
| Comparative Example 4 | Quartz/Glass | Sample 1 | 1 |
| Comparative Example 5 | Quartz/Glass | Sample 10 | 1 |
| Comparative Example 6 | Quartz/Glass | Sample 28 | 1 |
| Comparative Example 7 | YVO$_4$/Quartz | Sample 1 | 1 |
| Comparative Example 8 | YVO$_4$/Quartz | Sample 10 | 1 |
| Comparative Example 9 | YVO$_4$/Quartz | Sample 28 | 1 |
| Comparative Example 10 | KTP/YVO$_4$ | Sample 20 | 20 |
| Comparative Example 11 | KTP/YVO$_4$ | Sample 17 | 20 |
| Comparative Example 12 | KTP/YVO$_4$ | Sample 20 | 1 |
| Comparative Example 13 | KTP/YVO$_4$ | Sample 17 | 1 |

|  | Thickness (μm) | 150° C./ 100 H | 200° C./ 4 H | 250° C./ 4 H |
|---|---|---|---|---|
| Example 1 | 6 | ○ | ○ | ○ |
| Example 2 | 6 | ○ | ○ | ○ |
| Example 3 | 6 | ○ | ○ | ○ |
| Example 4 | 6 | ○ | ○ | ○ |
| Example 5 | 3 | ○ | ○ | ○ |
| Example 6 | 3 | ○ | ○ | ○ |
| Example 7 | 3 | ○ | ○ | ○ |
| Example 8 | 3 | ○ | ○ | ○ |
| Example 9 | 6 | ○ | ○ | ○ |
| Example 10 | 6 | ○ | ○ | ○ |
| Example 11 | 6 | ○ | ○ | ○ |
| Example 12 | 6 | ○ | ○ | ○ |
| Example 13 | 3 | ○ | ○ | ○ |
| Example 14 | 3 | ○ | ○ | ○ |
| Example 15 | 3 | ○ | ○ | ○ |
| Example 16 | 3 | ○ | ○ | ○ |
| Example 17 | 6 | ○ | ○ | ○ |
| Example 18 | 6 | ○ | ○ | ○ |
| Example 19 | 6 | ○ | ○ | ○ |
| Example 20 | 6 | ○ | ○ | ○ |
| Example 21 | 3 | ○ | ○ | ○ |
| Example 22 | 3 | ○ | ○ | ○ |
| Example 23 | 3 | ○ | ○ | ○ |
| Example 24 | 3 | ○ | ○ | ○ |
| Comparative example 1 | 6 | x | x | x |
| Comparative Example 2 | 6 | Δ | x | x |
| Comparative Example 3 | 6 | Δ | x | x |
| Comparative Example 4 | 6 | x | x | x |
| Comparative Example 5 | 6 | Δ | x | x |
| Comparative Example 6 | 6 | Δ | x | x |

-continued

| | Thickness (μm) | 150° C./ 100 H | 200° C./ 4 H | 250° C./ 4 H |
|---|---|---|---|---|
| Comparative Example 7 | 6 | x | x | x |
| Comparative Example 8 | 6 | Δ | x | x |
| Comparative Example 9 | 6 | Δ | x | x |
| Comparative Example 10 | 6 | ○ | ○ | Δ |
| Comparative Example 11 | 6 | ○ | ○ | Δ |
| Comparative Example 12 | 2 | ○ | ○ | Δ |
| Comparative Example 13 | 2 | ○ | ○ | Δ |

In 150° C./100 H in the Table 2, the wavelength converting elements 11 formed in the Example 1 to the Example 24 and the Comparative Example 1 to the Comparative Example 13 were stored in a constant temperature bath whose temperature was controlled to 150° C. for 100 hours. Then, the separation of the adhesive layers 22 was observed.

In 200° C./4 H in the Table 2, the wavelength converting elements 11 formed in the Example 1 to the Example 24 and the Comparative Example 1 to the Comparative Example 13 were stored in a constant temperature bath whose temperature was controlled to 200° C. for 4 hours. Then, the separation of the adhesive layers 22 was observed.

Further, in 250° C./4 H in the Table 2, the wavelength converting elements 11 formed in the Example 1 to the Example 24 and the Comparative Example 1 to the Comparative Example 13 were stored in a constant temperature bath whose temperature was controlled to 250° C. for 4 hours. Then, the separation of the adhesive layers 22 was observed.

○ illustrated in the Table 2 shows that the separation of the adhesive layer 22 is not generated. Δ indicates that a part of the adhesive layer 22 is peeled off. x indicates that a half or more of the adhesive layer 22 is peeled off.

Example 1

In the Example 1, the wafer of a KTP crystal having a substantially rectangular shape of about 1.5 cm×3.0 cm which was cut at an phase matching angle and a wafer obtained by cutting a wafer of a $YVO_4$ crystal formed in a substantially circular shape with the diameter of about 2.5 cm which was cut on a plane including an a-axis, that is, an a-plane to a half in the direction inclined by 45° relative to a c-axis were respectively optically polished with an accuracy sufficiently necessary for a laser oscillation.

Then, the adhesive of the above-described Sample 20 was applied to the adhesive surface of the optically polished wafer of the KTP crystal to stick the KTP crystal to the $YVO_4$ crystal so that the c-axis of the KTP crystal and the c-axis of the $YVO_4$ crystal were inclined by 45°. Here, the amount of application of the adhesive was adjusted so that the thickness of the adhesive layer 22 was 6 μm.

Then, the adhesive was irradiated with ultraviolet rays having the intensity of light of 1 mW/cm² to cure the adhesive.

Example 2

In the Example 2, the wavelength converting element 11 was formed and the adhesive layer 22 in the formed wavelength converting element 11 was observed under the same conditions as those of the Example 1 except that a Sample 17 was used for the adhesive.

Example 3

In the Example 3, the wavelength converting element 11 was formed and the adhesive layer 22 in the formed wavelength converting element 11 was observed under the same conditions as those of the Example 1 except that the adhesive was irradiated with ultraviolet rays having the intensity of light of 5 mW/cm² to cure the adhesive.

Example 4

In the Example 4, the wavelength converting element 11 was formed and the adhesive layer 22 in the formed wavelength converting element 11 was observed under the same conditions as those of the Example 3 except that a Sample 17 was used for the adhesive.

Example 5

In the Example 5, the wavelength converting element 11 was formed and the adhesive layer 22 in the formed wavelength converting element 11 was observed under the same conditions as those of the Example 1 except that the thickness of the adhesive layer 22 was 3 μm.

Example 6

In the Example 6, the wavelength converting element 11 was formed and the adhesive layer 22 in the formed wavelength converting element 11 was observed under the same conditions as those of the Example 5 except that a Sample 17 was used for the adhesive.

Example 7

In the Example 7, the wavelength converting element 11 was formed and the adhesive layer 22 in the formed wavelength converting element 11 was observed under the same conditions as those of the Example 1 except that the adhesive was irradiated with ultraviolet rays having the intensity of light of 5 mW/cm² to cure the adhesive and the thickness of the adhesive layer 22 was 3 μm.

Example 8

In the Example 8, the wavelength converting element 11 was formed and the adhesive layer 22 in the formed wavelength converting element 11 was observed under the same conditions as those of the Example 7 except that a Sample 17 was used for the adhesive.

Example 9

In the Example 9, the wavelength converting element 11 was formed and the adhesive layer 22 in the formed wavelength converting element 11 was observed under the same conditions as those of the Example 1 except that a quartz plate having the thickness of about 1 mm and a substantially square shape of about 15 mm×15 mm and a BK7 optical glass having the thickness of about 2 mm and a substantially rectangular shape of about 19 mm×25 mm were optically polished and stuck together.

Example 10

In the Example 10, the wavelength converting element 11 was formed and the adhesive layer 22 in the formed wavelength converting element 11 was observed under the same conditions as those of the Example 9 except that a Sample 17 was used for the adhesive.

Example 11

In the Example 11, the wavelength converting element 11 was formed and the adhesive layer 22 in the formed wavelength converting element 11 was observed under the same conditions as those of the Example 9 except that the adhesive was irradiated with ultraviolet rays having the intensity of light of 5 mW/cm² for curing the adhesive.

Example 12

In the Example 12, the wavelength converting element 11 was formed and the adhesive layer 22 in the formed wavelength converting element 11 was observed under the same conditions as those of the Example 11 except that a Sample 17 was used for the adhesive.

Example 13

In the Example 13, the wavelength converting element 11 was formed and the adhesive layer 22 in the formed wavelength converting element 11 was observed under the same conditions as those of the Example 9 except that the thickness of the adhesive layer was 3 μm.

Example 14

In the Example 14, the wavelength converting element 11 was formed and the adhesive layer 22 in the formed wavelength converting element 11 was observed under the same conditions as those of the Example 13 except that a Sample 17 was used for the adhesive.

Example 15

In the Example 15, the wavelength converting element 11 was formed and the adhesive layer 22 in the formed wavelength converting element 11 was observed under the same conditions as those of the Example 9 except that the adhesive was irradiated with ultraviolet rays having the intensity of light of 5 mW/cm² for curing the adhesive and the thickness of the adhesive layer 22 was 3 μm.

Example 16

In the Example 16, the wavelength converting element 11 was formed and the adhesive layer 22 in the formed wavelength converting element 11 was observed under the same conditions as those of the Example 15 except that a Sample 17 was used for the adhesive.

Example 17

In the Example 17, the wavelength converting element 11 was formed and the adhesive layer 22 in the formed wavelength converting element 11 was observed under the same conditions as those of the Example 1 except that a wafer obtained by cutting a wafer of a $YVO_4$ crystal formed in a substantially circular shape with the diameter of about 2.5 cm which was cut on an a-plane to a half and a quartz plate having a substantially rectangular shape of about 1.5 cm×3.0 cm were respectively optically polished and stuck together with an accuracy sufficiently necessary for a laser oscillation.

When the $YVO_4$ crystal is stuck to the quartz plate, the difference in coefficient of linear expansion between them is large as represented by 11.37 (c-axis of $YVO_4$)−0.58 (quartz)=9.78 ppm.

Example 18

In the Example 18, the wavelength converting element 11 was formed and the adhesive layer 22 in the formed wavelength converting element 11 was observed under the same conditions as those of the Example 17 except that a Sample 17 was used for the adhesive.

Example 19

In the Example 19, the wavelength converting element 11 was formed and the adhesive layer 22 in the formed wavelength converting element 11 was observed under the same conditions as those of the Example 17 except that the adhesive was irradiated with ultraviolet rays having the intensity of light of 5 mW/cm² for curing the adhesive.

Example 20

In the Example 20, the wavelength converting element 11 was formed and the adhesive layer 22 in the formed wavelength converting element 11 was observed under the same conditions as those of the Example 19 except that a Sample 17 was used for the adhesive.

Example 21

In the Example 21, the wavelength converting element 11 was formed and the adhesive layer 22 in the formed wavelength converting element 11 was observed under the same conditions as those of the Example 17 except that the thickness of the adhesive layer 22 was 3 μm.

Example 22

In the Example 22, the wavelength converting element 11 was formed and the adhesive layer 22 in the formed wavelength converting element 11 was observed under the same conditions as those of the Example 21 except that a Sample 17 was used for the adhesive.

Example 23

In the Example 23, the wavelength converting element 11 was formed and the adhesive layer 22 in the formed wavelength converting element 11 was observed under the same conditions as those of the Example 17 except that the adhesive was irradiated with ultraviolet rays having the intensity of light of 5 mW/cm² for curing the adhesive and the thickness of the adhesive layer 22 was 3 μm.

Example 24

In the Example 24, the wavelength converting element 11 was formed and the adhesive layer 22 in the formed wavelength converting element 11 was observed under the same conditions as those of the Example 23 except that a Sample 17 was used for the adhesive.

Comparative Example 1

In the Comparative Example 1, the wavelength converting element 11 was formed and the adhesive layer 22 in the formed wavelength converting element 11 was observed under the same conditions as those of the Example 1 except that a Sample 1 was used for the adhesive.

Comparative Example 2

In the Comparative Example 2, the wavelength converting element 11 was formed and the adhesive layer 22 in the formed wavelength converting element 11 was observed under the same conditions as those of the Example 1 except that a Sample 10 was used for the adhesive.

Comparative Example 3

In the Comparative Example 3, the wavelength converting element 11 was formed and the adhesive layer 22 in the formed wavelength converting element 11 was observed under the same conditions as those of the Example 1 except that a Sample 28 was used for the adhesive.

Comparative Example 4

In the Comparative Example 4, the wavelength converting element 11 was formed and the adhesive layer 22 in the formed wavelength converting element 11 was observed under the same conditions as those of the Example 9 except that a Sample 1 was used for the adhesive.

Comparative Example 5

In the Comparative Example 5, the wavelength converting element 11 was formed and the adhesive layer 22 in the formed wavelength converting element 11 was observed under the same conditions as those of the Example 9 except that a Sample 10 was used for the adhesive.

Comparative Example 6

In the Comparative Example 6, the wavelength converting element 11 was formed and the adhesive layer 22 in the formed wavelength converting element 11 was observed under the same conditions as those of the Example 9 except that a Sample 28 as used for the adhesive.

Comparative Example 7

In the Comparative Example 7, the wavelength converting element 11 was formed and the adhesive layer 22 in the formed wavelength converting element 11 was observed under the same conditions as those of the Example 17 except that a Sample 1 was used for the adhesive.

Comparative Example 8

In the Comparative Example 8, the wavelength converting element 11 was formed and the adhesive layer 22 in the formed wavelength converting element 11 was observed under the same conditions as those of the Example 17 except that a Sample 10 as used for the adhesive.

Comparative Example 9

In the Comparative Example 9, the wavelength converting element 11 was formed and the adhesive layer 22 in the formed wavelength converting element 11 was observed under the same conditions as those of the Example 17 except that a Sample 28 as used for the adhesive.

Comparative Example 10

In the Comparative Example 10, the wavelength converting element 11 was formed and the adhesive layer 22 in the formed wavelength converting element 11 was observed under the same conditions as those of the Example 1 except that the adhesive was irradiated with ultraviolet rays having the intensity of light of 20 mW/cm$^2$ for curing the adhesive.

Comparative Example 11

In the Comparative Example 11, the wavelength converting element 11 was formed and the adhesive layer 22 in the formed wavelength converting element 11 was observed under the same conditions as those of the Example 10 except that a Sample 17 was used for the adhesive.

Comparative Example 12

In the Comparative Example 12, the wavelength converting element 11 was formed and the adhesive layer 22 in the formed wavelength converting element 11 was observed under the same conditions as those of the Example 1 except that the thickness of the adhesive layer 22 was 2 μm.

Comparative Example 13

In the Comparative Example 13, the wavelength converting element 11 was formed and the adhesive layer 22 in the formed wavelength converting element 11 was observed under the same conditions as those of the Comparative Example 12 except that a Sample 17 was used for the adhesive.

In the results of the Table 2, when the acrylic adhesive having features that the glass transition point Tg of the adhesive was 75° C. or lower and the refractive index nD of the cured material of the adhesive was 1.52 or lower was used, the adhesive layer 22 was not peeled off under the conditions of 150° C./100 H and 200° C./4 H. Further, under the condition of 250° C./4 H as a more severe condition, when the intensity of light of ultraviolet ray was 5 mW/cm$^2$ or lower and the thickness of the film was 3 μm or more, the separation of the adhesive layer 22 or the like was not generated.

On the other hand, the adhesive having the glass transition point Tg higher than 75° C., the adhesive having the refractive index nD higher than 1.52, or the epoxy adhesive could not maintain a sufficient adhesion under any of the conditions of 150° C./100 H, 200° C./4 H and 250° C./4 H, and the adhesive layer 22 was peeled off.

As apparent from the results shown in the Table 2, the acrylic adhesives having the glass transition point Tg of 75° C. or lower could mitigate a stress generated in the adhesive layer 22 due to a thermal expansion. Further, it was understood that the adhesives which were irradiated with the ultraviolet rays having the intensity of light of 5 mW/cm$^2$ or lower to be cured were used so that the first crystal part 20 and the second crystal part could be stuck to each other with high accuracy without a curve due to the anisotropic characteristics of the first crystal part and the second crystal part owing to heat. Further, as apparent from the results shown in the Table 2, when the adhesive was applied so that the thickness of the adhesive layer 22 was 3 μm or more, the first crystal part and the second crystal part could be highly accurately stuck together without a curve due to the anisotropic characteristics of them owing to heat.

In the method for producing the wavelength converting element 11 to which the present invention is applied, the crystal parts can be stuck to each other without a curve of the wafers due to the stress of the first selective transmitting film 23 and the second selective transmitting film 24. Accordingly, the adhesive layer 22 having uniform thickness can be obtained. Thus, the produced wavelength converting element 11 can not only improve various kinds of characteristics, but also suppress unevenness in characteristics of the cut wavelength converting elements 11. Further, a large quantity of wavelength converting elements 11 having good qualities can be produced, so that productivity can be improved and a manufacture cost can be reduced.

As described above, the thickness of the adhesive layer 22 can be adjusted to be larger than 1 μm. However, when the thickness of the film is large, the parallel accuracy of the film thickness of the adhesive layer 22 is deteriorated. Therefore, the thickness of the adhesive layer 22 is preferably 20 μm or smaller.

Further, in the above-described Examples, the adhesives irradiated with the ultraviolet rays or the visible rays to be cured are used. It is to be understood that an adhesive heated to be cured may be used.

Further, as a condition of applying the ultraviolet rays or the visible rays for curing the adhesive, a method for using an existing light source such as a metal halide lamp, a black light lamp, a mercury lamp, natural light, etc. may be employed. Specifically, as the irradiation condition, the intensity of light ranging from 0.1 mW/cm$^2$ to 200 mW/cm$^2$ may be used. As the irradiation conditions of the ultraviolet rays or the visible rays, the adhesive is desirably irradiated with the rays having the intensity of light of 0.1 mW/cm$^2$ and more and 5 mW/cm$^2$ or less and an amount of irradiation of rays designated by the maker. To improve the adhesive strength of the adhesive, a thermosetting step may be performed after the irradiation with the ultraviolet rays or the visible rays.

It is obvious for a person with ordinary skill in the art that various changes, substitutions or equivalence thereto can be made in the present invention without departing the scope of the attached claims and the gist thereof.

INDUSTRIAL APPLICABILITY

As described above, according to the present invention, in the optical element, the first crystal part including KTiOPO$_4$ or quartz and the second crystal part including YVO$_4$ doped with Nd in which opposed surface have coefficients of linear expansion different by 5 ppm or more are stuck together by using the acrylic adhesive having the glass transition point of 75° C. or lower, and the refractive index of the cured material of the adhesive is 1.52 or lower. In the optical element, the adhesive layer mitigates the stress due to the difference in thermal expansion. Thus, the separation of the adhesive layer from the first crystal part or the second crystal part, or the damage of the first crystal part or the second crystal part can be suppressed.

Therefore, the reliability of the optical element is improved and the input beam with high output can be met.

The invention claimed is:
1. An optical element for converting a pump light of prescribed wavelength emitted from a light source into output light of wavelength different from the prescribed wavelength of the light source; the optical element comprising:

a first crystal part including KTiOPO$_4$ or quartz or being comprised of YVO$_4$ doped with Nd;
a second crystal part including YVO$_4$ doped with Nd or being comprised of KTiOPO$_4$ or quartz;
a first selective transmitting film provided on a first surface of the first crystal part at which the pumped light is incident, said first selective transmitting film transmitting the pump light and reflecting a basic light beam emitted from said first crystal part when being pumped by said pump light;
a second selective transmitting film provided on a second surface of the second crystal part provided for outputting the output light having the converted wavelength, said second selective transmitting film transmitting the output light and reflecting the basic light beam emitted from said first crystal part; and
an adhesive layer disposed between a light-transmitting portion of the first crystal part and a light transmitting portion of the second crystal part such that a second surface of the first crystal part facing the second crystal part is stuck to a first surface of the second crystal part facing the first crystal part, the adhesive layer being formed to a thickness in the range of more than 2 μm and less than or equal to 20 μm,
wherein a second surface of the first crystal part and a first surface of the second crystal part opposed to each other through the adhesive layer have coefficients of linear expansion which are different by 5 ppm or more and the surfaces of said first and second crystal parts opposed to each other through the adhesive layer are disposed so as to include crystallographic axes, and the adhesive layer is a cured acrylic adhesive whose glass transition point is 75° C. or lower, the refractive index of the adhesive layer after cure being equal to or greater than 1.49 and less than or equal to 1.52.

2. The optical element according to claim 1, wherein the adhesive layer is formed by curing the adhesive by irradiating the adhesive with ultraviolet rays or visible rays having an output of 5 mW/cm$^2$ or lower.

3. A light emitting device comprising:
a light source for emitting pump light of prescribed wavelength;
an optical element including a first crystal part including KTiOPO$_4$ or quartz;
a second crystal part including YVO$_4$ doping Nd; and
an adhesive layer disposed between a light-transmitting portion of the first crystal part and a light transmitting portion of the second crystal part such that a second surface of the first crystal part facing the second crystal part is stuck to a first surface of the second crystal part facing the first crystal part, the adhesive layer being formed to a thickness in the range of more than 2 μm and less than or equal to 20 μm,
the optical element converting light of wavelength emitted from the light source into light of wavelength different from the prescribed wavelength for outputting,
wherein surfaces of the first crystal part and the second crystal part opposed to each other through the adhesive layer have coefficients of linear expansion which are different by 5 ppm or more and the surfaces opposed to each other through the adhesive layer are disposed so as to include crystallographic axes, and the adhesive layer is a cured acrylic adhesive whose glass transition point is 75° C. or lower, the refractive index of the adhesive layer after cure being equal to or greater than 1.49 and less than or equal to 1.52, and further comprising a first selective transmitting film provided on a first surface of the first crystal part at which the pump light is incident, said first selective transmitting film transmitting the pump light and reflecting a basic light beam emitted from said first crystal part when being pumped by said pump light;

a second selective transmitting film provided on a second surface of the second crystal part provided for outputting output light having the converted wavelength, said second selective transmitting film transmitting the output light and reflecting the basic light beam emitted from the first crystal part.

4. The light emitting device according to claim 3, wherein the adhesive layer is formed by curing the adhesive by irradiating the adhesive with ultraviolet rays or visible rays having an output of 5 mW/cm$^2$ or lower.

5. The light emitting device according to claim 3, further including an emitting lens for adjusting the form of a beam of the light which is outputted from the optical element with its wavelength converted into wavelength different from the prescribed wavelength.

6. An optical element for converting a pump light of prescribed wavelength emitted from a light source into output light of wavelength different from the prescribed wavelength of the light source; the optical element comprising:

a first crystal part including $KTiOPO_4$ or quartz or being comprised of YVO4 doped with Nd;

a second crystal part including $YVO_4$ doped with Nd or being comprised of KTiOPO4 or quartz; and an adhesive layer disposed between a light-transmitting portion of the first crystal part and a light transmitting portion of the second crystal part such that a second surface of the first crystal part facing the second crystal part is stuck to a first surface of the second crystal part facing the first crystal part, the adhesive layer being formed to a thickness in the range of more than 2 μm and less than or equal to 20 μm, wherein the surface of the first crystal part and the surface of the second crystal part opposed to each other through the adhesive layer have coefficients of linear expansion which are different by 5 ppm or more and the surfaces of said crystal parts opposed to each other through the adhesive layer are disposed so as to include crystallographic axes, and the adhesive layer is a cured acrylic adhesive whose glass transition point is 75° C. or lower, the refractive index of the adhesive layer after cure being equal to or greater than 1.49 and less than or equal to 1.52.

7. The optical element according to claim 1, wherein the surfaces of the first crystal part and the second crystal part that are opposed to each other have an orientation that includes at least the c-axis of the respective crystals.

8. The light emitting device according to claim 3, wherein the surfaces of the first crystal part and the second crystal part that are opposed to each other have an orientation that includes at least the c-axis of the respective crystals.

9. The optical element according to claim 6, wherein the surfaces of the first crystal part and the second crystal part that are opposed to each other have an orientation that includes at least the c-axis of the respective crystals.

10. The optical element according to claim 1, wherein the thickness of said adhesive layer is in the range of more than 2 μm and less than 5 μm.

11. The light emitting device according to claim 3, wherein the thickness of said adhesive layer is in the range of more than 2 μm and less than 5 μm.

12. The optical element according to claim 6, wherein the thickness of said adhesive layer is in the range of more than 2 μm and less than 5 μm.

13. The optical element according to claim 1, wherein the adhesive layer is a cured acrylic adhesive whose glass transition point is equal to or less than 3° C.

14. The light emitting device according to claim 3, wherein the adhesive layer is a cured acrylic adhesive whose glass transition point is equal to or less than 3° C.

15. The optical element according to claim 6, wherein the adhesive layer is a cured acrylic adhesive whose glass transition point is equal to or less than 3° C.

* * * * *